(No Model.)
P. B. GRIMES.
NUT LOCK.
No. 447,771. Patented Mar. 10, 1891.
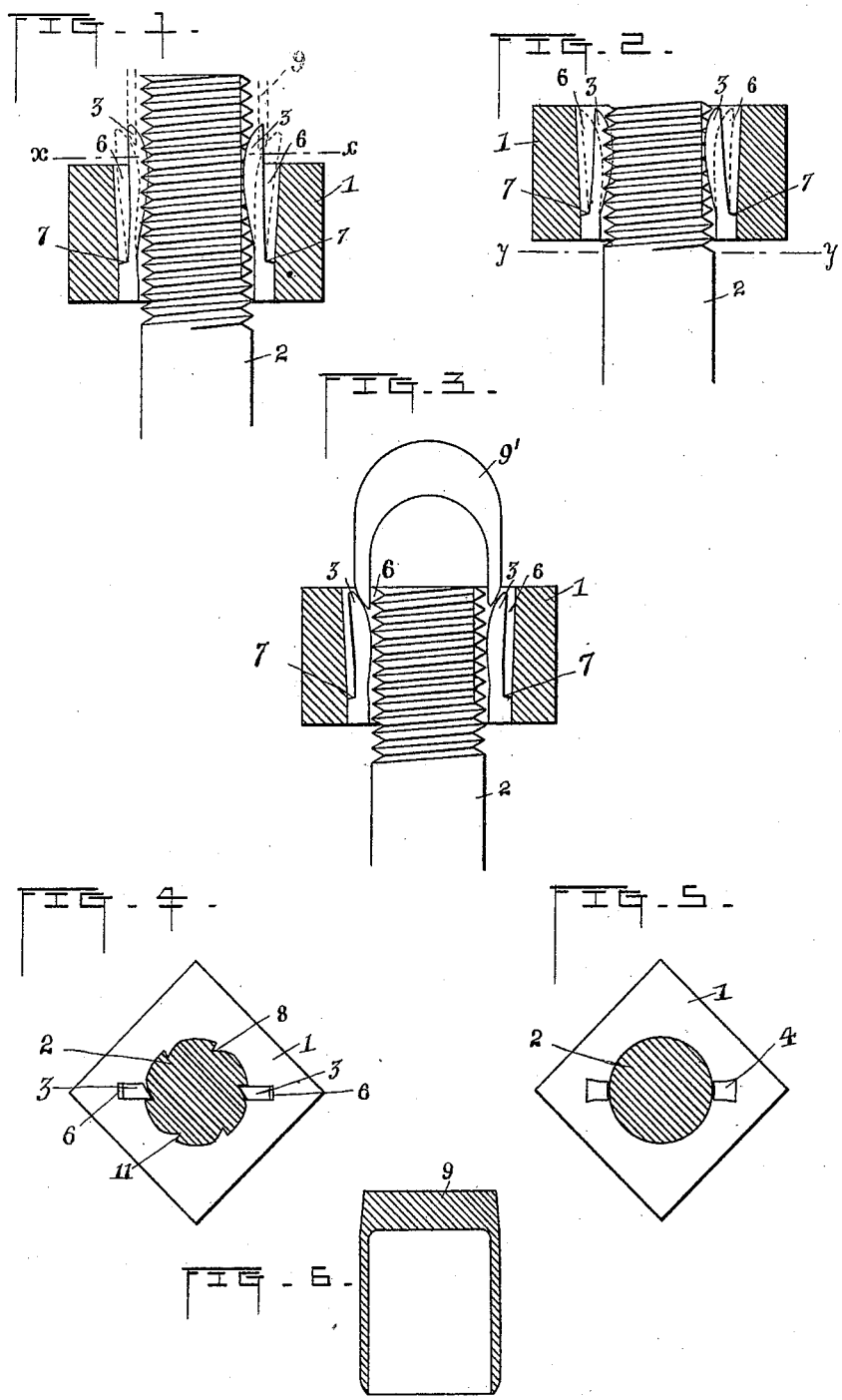
Witnesses
Archie M. Catlin
James Mellen
Inventor
Phillips B. Grimes
By his Attorney
Benj. R. Catlin
THE NORRIS PETERS CO., PHOTO-LITHO., WASHINGTON, D. C.

UNITED STATES PATENT OFFICE.

PHILLIPS BAILEY GRIMES, OF GLENWOOD, MISSOURI.

NUT-LOCK.

SPECIFICATION forming part of Letters Patent No. 447,771, dated March 10, 1891.

Application filed May 21, 1890. Serial No. 352,590. (No model.)

*To all whom it may concern:*

Be it known that I, PHILLIPS BAILEY GRIMES, a citizen of the United States, residing at Glenwood, in the county of Schuyler and State of Missouri, have invented certain new and useful Improvements in Nut-Locks; and I do hereby declare the following to be a full, clear, and exact description of the invention, such as will enable others skilled in the art to which it appertains to make and use the same.

The object of the invention is to provide a simple and efficient nut-lock that will permit easy application or removal of the nut and also provide for a close adjustment thereof in a locked position; and it consists in the matters hereinafter described and pointed out.

In the drawings, Figure 1 is a vertical section of a nut with locking-springs, the bolt which is partially broken away being shown in elevation. Fig. 2 is a similar view of a modified form. Fig. 3 is a like view showing the application of a device for releasing the spring-catches. Fig. 4 is a transverse section on line $x\ x$ of Fig. 1. Fig. 5 is a section on line $y\ y$ of Fig. 2; and Fig. 6 is a central section of a releasing device, the use of which is indicated in dotted lines in Fig. 1.

Numeral 1 indicates a nut interiorly screw-threaded, and 2 a correspondingly threaded bolt or rod. Spring pins or catches are indicated by 3 3. These are fastened in slots or recesses 6 6, formed in the interior of the nut in such manner that their free ends will normally be in contact with the bolt and upon suitable rotation will engage grooves 8 8, formed transversely of the screw-threads or lengthwise of the bolt, as indicated in Figs. 4 and 5. The grooves do not extend entirely across the screw-threads, a space being usually left about equal to one-third of the length of the nut, which is entire or without the grooves, whereby the locking of the nut in such position that the releasing device cannot reach the springs to spread them is obviated. The springs have each a part 4 adapted to enter one of the aforesaid recesses, which may in cross-section be of dovetail form. If, however, they are secured in the nut in the process of casting, the form of the recesses will be immaterial. They must, however, extend through the nut to provide receptacles for the free ends of the springs 3 3 when the latter are pushed back from engagement with the lengthwise grooves 6 on the face of the bolt. The backs of the springs are cut away or otherwise shaped, as shown at 7, to permit them to be sprung away from their normal position of engagement with the grooves. The parts 4 of the springs are not of sufficient depth to reach the bolt; but opposite the cut-away portions they are curved or extended toward and in contact with the bolt, and when the parts are suitably adjusted they lie in the grooves 8, as stated. Their inner faces are beveled or rounded on one edge to facilitate rotation on the bolt. The other edge is made sharp to more securely engage a like edge or shoulder of a groove. At their extreme outer ends they are curved away from the bolt or beveled, as shown, to adapt them to receive a releasing device 9 or 9'. The grooves are each formed with a shoulder 11, whose face is radially arranged with respect to the bolt, or which may be undercut, as illustrated in Fig. 4.

When the screw-threads are formed as shown, the bolt is entered in the nut and turned to the left or the latter turned to the right. The springs offer no appreciable resistance, and they permit the nut to be screwed on to any desired distance. If, however, the nut be turned in the opposite direction, the springs at once engage the shoulders of the grooves and prevent further unscrewing of the nut. They can be released, however, when desired by the use of the thimble 9, (see Fig. 6,) which is made of such size that it passes freely over the end of the bolt and between it and the recurved or chamfered faces of the spring ends. It can be thus applied and made to hold the springs out of engagement with the grooves, whereupon the nut can be unscrewed and removed. The exterior of the lower end of the releasing-thimble 9 is preferably ribbed or grooved to prevent the slipping of the thimble around between the springs and bolt. Thus constructed, either the nut can be turned by turning the thimble, or if the latter be held stationary it will hold the nut and springs so that the bolt can be unscrewed. The unscrewing of the parts, however, is not dependent upon an engagement of the springs with the thimble in a circumferential direction, for the latter distends the springs and holds them unlocked whether it rotates or not. A releasing device 9, of the form shown in Fig. 6, is, if desired, made applicable to springs that do not extend beyond the nut by beveling the outer edge of the latter, so that the thimble 9 can be entered a little way in the nut and between the springs, substantially as in the case of the releasing device 9'.

The form shown in Fig. 3 enters the slots 6 between the springs and the bolt to lift them out of their grooves by means of legs of proper size, as explained.

The principle of operation of the above-described device is the same whether a greater or less number of grooves 8 8 are employed, though it is evident that the greater the number the more closely to any desired position can the nut be locked. It is also obvious that the device can be applied equally well to a right or left hand screw-bolt; and it may be further noted that the locking-springs are or may be mainly concealed, and that they cannot well be disturbed accidentally nor purposely without great difficulty unless by the use of a specially-prepared releasing device. The use of two or more spring-catches is preferred, as they form a more secure lock, and also for the reason that a special device is necessary to unlock them.

I am aware that springs and spring-bolts have been secured to nuts and made to engage transverse grooves formed in bolts, and such matters are not broadly claimed.

By my improvement the spring is arranged lengthwise of the bolt and between it and the nut, whereby it is effectually concealed, while it is also adapted to engage the groove in the bolt laterally, and thus provide a powerful lock.

I lay no claim to a catch that passes through the nut or engages the bolt by its end or point or that is exposed, nor broadly to catches adapted to the use of releasing devices.

Having thus described my invention, what I desire to secure by Letters Patent, is—

1. The threaded bolt provided with grooves arranged transversely to the threads, a threaded nut provided with spring-catches secured in its interior lengthwise thereof and between the bolt and nut and having slots to receive the springs and adapted to engage them through the major part of their length, said springs being normally in contact with the bolt and having flared or beveled ends to adapt them to receive a releasing device, substantially as set forth.

2. The spring cut away at the back and flared outwardly at the ends and having the parts 4 secured in the slots in the interior of the nut near one end and extending to near the other end thereof, said slots being also extended nearly the whole length of the nut and adapted to receive the side of the springs when forced away from the bolt, in combination with the nut and with the bolt provided with longitudinal grooves, but having its threads entire at the upper screw-threaded portion for a distance equal to about one-third the length of the nut, substantially as set forth.

3. The combination of the grooved bolt and the slotted nut with the springs lying lengthwise between the bolt and nut and having parts 4 and cut away at the back and flared at the ends, said ends extending to about the end of the nut, the slots being deeper than the springs and the latter normally in contact with the bolt, all substantially as specified, whereby the springs normally lie lengthwise in the grooves, and whereby a releasing device can be entered in the nut beyond the outer screw-threads thereof to release the concealed springs from the grooves in the bolt, substantially as set forth.

In testimony whereof I hereto affix my signature in presence of two witnesses.

PHILLIPS BAILEY GRIMES.

Witnesses:
JAMES M. GRAY,
J. S. RHOADES.